US006324376B1

(12) United States Patent
Koguchi

(10) Patent No.: US 6,324,376 B1
(45) Date of Patent: Nov. 27, 2001

(54) HEATING APPARATUS

(75) Inventor: Hideyuki Koguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/348,835

(22) Filed: Jul. 8, 1999

(30) Foreign Application Priority Data

Jul. 9, 1998 (JP) .................................................. 10-194157

(51) Int. Cl.[7] .......................... G03G 15/20; G03B 13/00; H05B 3/00

(52) U.S. Cl. .......................... 399/335; 399/336; 396/575; 219/216

(58) Field of Search ............................ 355/405; 219/216, 219/469; 101/471, 470; 347/171; 430/348, 350, 353; 396/575; 165/89; 399/335, 336, 132, 320

(56) References Cited

U.S. PATENT DOCUMENTS 3,081,699 3/1963 Gulko .................................. 101/471
3,333,088 * 7/1967 Verbeek ............................... 219/471
3,436,523 4/1969 Umahashi et al. .................... 219/216
3,632,984 * 1/1972 Brownscombe ...................... 219/469
3,739,143 * 6/1973 Amundson et al. ................. 219/216
3,757,662 * 9/1973 Ingels .................................. 219/216
3,946,230 * 3/1976 Sullivan, Jr. et al. ............... 430/348
4,064,933 * 12/1977 Schuman ................................ 165/89
5,975,772 * 11/1999 Imai et al. ........................... 396/575

FOREIGN PATENT DOCUMENTS 60-135944 7/1985 (JP) .............................. G03D/13/00

* cited by examiner

*Primary Examiner*—Russell Adams
*Assistant Examiner*—Rodney Fuller
(74) *Attorney, Agent, or Firm*—Sughrue, Mion, Zinn, Macpeak & Seas, PLLC

(57) ABSTRACT

A heating apparatus which forms an image by heating a sheet-form material carrying image data. The heating apparatus comprises a heater, which is disposed at an axial center portion of the sheet-form material, for directly heating the sheet-form material to a temperature suitable for heat developing processing, and rings or a cylinder for rotating and allowing the sheet-form material to be exposed to the heater. The sheet-form material can be rotated on either an inner or outer surface of the rings or an inner surface of the cylinder. In addition, a plurality of rings can be used which correspond to differing widths of sheet-form material.

27 Claims, 9 Drawing Sheets

HEATING APPARATUS

BACKGROUND OF THE INVENTION

1. Field of the Invention

The present invention relates to a heat developing apparatus, and more precisely, to a heating apparatus which forms an image by heating a sheet-form material, which carries image data thereon.

2. Description of the Related Art

A lithographic film (a photosensitive material) has been used for a long time for printing newspaper, magazines, and the like. In the same way as a photographic film, an image can be formed on a photosensitive material such as the lithographic film, by carrying out processing (wet processing) such as developing and fixation. However, when each processing such as developing and fixation, is carried out by wet processing, the developing processing becomes complicated. Moreover, since each processing is carried out by soaking the lithographic film in processing tanks in sequence, each of which stores a processing solvent (e.g., a developer or a fixer), there has been a problem with this method in that control of each processing is troublesome, and deterioration of a heat developing apparatus itself is accelerated by dirt or the like adhering to the heat developing apparatus.

In contrast, a heat developing apparatus capable of developing processing on photosensitive materials such as the lithographic film without complicated processing (the wet processing) such as development and fixation, has been proposed. This heat developing apparatus carries out developing processing by superposing a photosensitive material, on which an image has been exposed, and an image receiving material one on top of the other, heating them for a certain period of time, and then peeling the photosensitive material from the image receiving material, and drying them (i.e., so-called dry processing is carried out).

As shown in FIG. 8, a photosensitive material 126, on which an image has been exposed by an exposure device 102 provided adjacent to a heat developing apparatus 100, is inserted into the heat developing apparatus 100 from an insertion opening 104, and is conveyed by plural transport rollers 106. A water application section 108 and a heat developing section 110 are provided along the direction the photosensitive material 126 is conveyed. At the water application section 108, water is applied onto the photosensitive material 126, so that the adhesion between the photosensitive material 126 and a processing sheet (i.e., the above-described image receiving material) 112 can be improved. A heating drum 114 is provided in the heat developing section 110. A heater 116, which is contained inside the heating drum 114, raises the temperature of the rotating heating drum, and the photosensitive material 126 and the processing sheet 112 conveyed along the outer peripheral surface of the heating drum 114 are heated for a predetermined period of time (i.e., heat developing processing is carried out). At this time, the photosensitive material 126 and the processing sheet 112, which have been superposed one on top of the other, are conveyed in a state in which they are attached by pressure. After completion of heat developing processing, the photosensitive material 126 is peeled from the processing sheet 112, and is dried by plural fans 118.

Moreover, as shown in FIG. 9, a heat developing section 110A may be structured such that plural heating plates 120A to 120E are provided in a circular arc configuration in order to restrict the height of a heat developing apparatus 100A. A flat heater (not shown) and a flat temperature sensor (also not shown) are built into the heating plates 120A to 120E, and the heating plates 120A to 120E are heated so as to be a suitable temperature for heat developing processing. That is, heat developing processing is carried out by conveying the photosensitive material 126 and the processing sheet 112, which have been laminated together, along the circular arc configuration of the heating plates 120A to 120E through a belt 124.

Therefore, since a liquid containing chemicals, such as a processing solvent, is not used, nuisances such as liquid storing, replenishment control, and apparatus cleaning can be avoided, and maintenance properties of the apparatus can be improved.

However, in the heat developing apparatus 100 shown in FIG. 8, heat developing processing is carried out by conveying the photosensitive material 126 and the processing sheet 112 along an outer peripheral surface of the heating drum 114 set in the heat developing section 110, and by attaching the photosensitive material 126 and the processing sheet 112 onto the outer peripheral surface of the heating drum 114 from pressure by a pressing belt 122. Moreover, in the heat developing apparatus 100A shown in FIG. 9, heat developing processing is carried out by conveying the photosensitive material 126 and the processing sheet 112 along the circular arc configuration of the heating plates 120A to 120E through the belt 124. That is, heat developing processing is carried out in a state in which the photosensitive material 126 and the processing sheet 112 laminated together are caused to contact with and to be attached by pressure to the heating drum 114 or the belt 124 wound around the heating plates 120A to 120E.

Accordingly, since a mechanism for causing the photosensitive material 126 and a processing sheet 112 to contact with and to be attached by pressure to the heating drum 114 or the belt 124 wound around the heating plates 120A to 120E is needed, there is a problem with this method in that the inner structure of the heat developing apparatus becomes complicated.

In the heat developing apparatus 100 shown in FIG. 8, the heater 116 is built in the heating drum 114, and the photosensitive material 126 and the processing sheet 112 are heated via the heating drum 114. Moreover, in the heat developing apparatus 100A shown in FIG. 9, the flat heater is built into the heating plates 120A to 120E, and the photosensitive material 126 and the processing sheet 112 are heated by the heating plates 120A to 120E and by the belt 124 wound around the heating plates 120A to 120E. In this way, since the conventional heat developing apparatuses 100, 100A are structured such that the photosensitive material 126 and the processing sheet 112 are heated indirectly, not only the photosensitive material 126 and the processing sheet 112, but also the heating drum 114 and the heating plates 120A to 120E need to be heated, so that a heater of a large capacity must be built thereinto. Accordingly, there is another problem in that manufacturing costs of the heat developing apparatus increase.

Further, the heating drum 114 and the heating plates 120A to 120E are cooled gradually. Therefore, there is a problem in that when heat developing processing is carried out continuously on the photosensitive material 126, the temperature of the heating drum 114 and the heating plates 120A to 120E is unstable, and it is difficult to adjust the temperature to a value suitable for heat developing processing. Moreover, there is another problem in that an uneven developing is caused by the shapes of the heating drum 114 and the heating plates 120A to 120E, so that an image cannot be formed accurately.

In contrast, there is a method for heating a photosensitive material without using the heating drum 114 and the heating plates 120A to 120E. In such a method, a heater is provided so as to face the photosensitive material conveyed linearly, so that the photosensitive material is heated by relative movement of the photosensitive material and the heater.

However, when this method is used, it takes considerable time to heat the photosensitive material. Moreover, when the heater is moved, the heater is cooled by the air flow generated around the heater, and the heating temperature of the photosensitive material becomes unstable, so that failures such as breaking of filaments or the like easily occur inside the heater. Furthermore, since a mechanism for moving the heater is needed, there is a problem in that the inner structure of the apparatus becomes complicated, and the apparatus itself becomes larger.

SUMMARY OF THE INVENTION

The present invention is provided so as to solve the aforementioned problems, and an object of the present invention is to provide a heating apparatus which carries out heat processing such as heat developing processing on sheet-form materials by effectively utilizing heat generated by heating means.

In order to achieve the aforementioned object, a heating apparatus of the present invention, which forms an image by heating a sheet-form material carrying image data thereon, comprises a pair of winding means disposed at positions corresponding to both transverse direction ends of the sheet-form material, one of the pair being fixed and the other being movable along the transverse direction of the sheet-form material, and heating means disposed at an axial center portion of the sheet-form material wound around along the winding means, the heating means directly heating the sheet-form material so that the temperature becomes a value suitable for heat developing processing for example, in the range of from 80° C. to 250° C. preferably from 100° C. to 140° C.

In a first aspect of the present invention, the pair of winding means is provided at the positions corresponding to at least the both transverse direction ends of the sheet-form material such that when the sheet-form material is wound around along the winding means, the sheet-form material is curved in a circular arc shape. The winding means is formed, for example, in a ring shape which corresponds with an area of the sheet-form material where no image data is carrieed thereon, and the inner circumferential surface of the sheet-form material is open at least in an area where image data is carried thereon.

Moreover, the heating means for heating the sheet-form material so that the temperature becomes the value suitable for heat developing processing is provided at an axial center portion of the curved sheet-form material. In a case, for example, in which the winding means formed in a ring shape is provided as described above, the heating means is provided at the center position of the winding means. The heating means is provided along the transverse direction of the sheet-form material, and the inner circumferential surface of the sheet-form material is open, thereby allowing the sheet-form material to be heated directly.

In this way, since the sheet-form material is directly heated by the heat generated by the heating means, there is no need for a large-capacity heater for carrying out heat developing processing on the sheet-form material, and no need for a heating drum or a heating plate. Accordingly, heat processing can be carried out on the sheet-form material by effectively utilizing the heat generated by the heating means. Moreover, the inner structure of the heating apparatus can be simplified, and manufacturing costs of the heating apparatus can be reduced. Further, since there is no need for a heating drum or a heating plate, the temperature can easily be adjusted during heat developing processing, and heat processing can be carried out without causing uneven developing.

The winding means of the present invention may be a type which contacts an internal surface side of the two transverse direction ends of the sheet-form material curved in a circular arc shape, or one which contacts an outer peripheral surface of the sheet-form material curved in a circular arc shape.

That is, as the winding means, substantially ring-shaped members can be provided at positions facing the both transverse direction ends of the sheet-form material, and the ring-shaped members can be either the type where the sheet-form material is wound around an outer peripheral surface thereof, or the type where the sheet-form material is curved along an inner circumferential surface thereof.

In a case in which the pair of winding means is provided facing the two transverse direction ends of the sheet-form material, at least one of the pair of winding means may be movable along the transverse direction of the sheet-form material.

For example, one of the pair of winding means is fixed at a position corresponding to a transverse direction end of the sheet-form material, and the other one of the pair of winding means is movable along the transverse direction of the sheet-form material in correspondence with the width dimension of the sheet-form material. In this way, heat processing of a plurality of sheet-form materials with various width dimensions can be carried out.

Moreover, one of the winding means, which is used commonly by the plurality of sheet-form materials with various width dimensions, may be provided at a transverse direction end of the sheet-form material, and the winding means may be provided at each position corresponding with each of the other transverse direction ends of the sheet-form materials with various width dimensions. That is, at least three of the winding means are provided, at positions corresponding with the two transverse direction ends of each of the plurality of the sheet-form materials with various width dimensions, thereby making possible elimination of the trouble of moving the winding means in accordance with the width dimension of the sheet-form material to be heated. In this case, it is preferable that the winding means is formed with a material such as a heat-resisting glass which transmits the heat emitted from the heating means.

When such winding means is used, reflecting means for reflecting heat emitted by the heating means toward the sheet-form material, which has been curved in a circular arc shape by being wound around along the winding means, may be provided.

An aluminum plate, for example, or the like is provided as the reflecting means, and is provided along the outer peripheral surface of the sheet-form material wound around along the winding means. In this way, the heat emitted from the heating means and transmitted through the sheet-form material is effectively reused to heat the sheet-form material. Accordingly, the thermal efficiency of the heat emitted from the heating means while heating the sheet-form material can be improved.

Moreover, the winding means of the present invention may comprise a cylindrical member, and the sheet-form material may be curved along an inner circumferential surface of the cylindrical member.

That is, the sheet-form material is curved in a circular arc shape by being disposed along the inner circumferential surface of the cylindrical member. This allows the winding means to work as the above-described reflecting means, so that the thermal efficiency while heating the sheet-form material can be improved.

In this way, since heat processing can be carried out by curving, with the winding means, the sheet-form material in a circular arc shape in a state in which the inner circumferential surface thereof is open, the sheet-form material can directly be heated by the heat emitted from the heating means. Accordingly, when heat developing processing, for example, and the like is carried out on the sheet-form material, there is no need for heating means with a large capacity, and no need for a heating drum or heating plate. Therefore, the inner structure of the heat developing apparatus can be simplified, and manufacturing costs of the heat developing apparatus can be reduced. Further, since there is no need for the heating drum or the heating plate, the temperature can easily be adjusted during heat developing processing, and heat developing processing can be carried out without causing uneven developing. In accordance with the above, heat developing processing on the sheet-form material can be carried out by effectively utilizing the heat emitted from the heating means.

It is preferable that the present invention further comprises a heat adjusting means, which is provided so as to cover an outer peripheral surface of the heating means, for adjusting a heating state of the sheet-form material by the heating means.

In accordance with the present invention, the heat adjusting means is provided between the sheet-form material wound around along the winding means and the heating means. When the heat emitted from the heating means is not uniform, the heat adjusting means adjusts the heat so that the sheet-form material is heated uniformly.

In this way, the sheet-form material can be heated uniformly by the heat emitted from the heating means, so that when heat developing processing, for example, is carried out, the material can be heated uniformly, thereby preventing uneven developing, which is due to unevenness in the heating temperature and the like, from being caused.

As such, heat adjusting means, which comprises a substantially cylindrical heat insulating member, in which a slit-form opening portion with a certain width is formed along the transverse direction of the sheet-form material, may be used.

In a case in which the state of heat distribution of the heat emitted from the heating means is uneven, the state of heat distribution during the heating process of the sheet-form material can easily be made uniform by adjusting the width of the slit-form opening portion on the heat insulating member in accordance with the state of heat distribution of the heating means. Moreover, because of the width adjustment of the slit-form opening portion on the heat insulating member, the heating time for the sheet-form material, by which the sheet-form material becomes a predetermined heated state, is also adjustable.

DESCRIPTION OF THE PREFERRED EMBODIMENTS

First Embodiment

Figure 1:
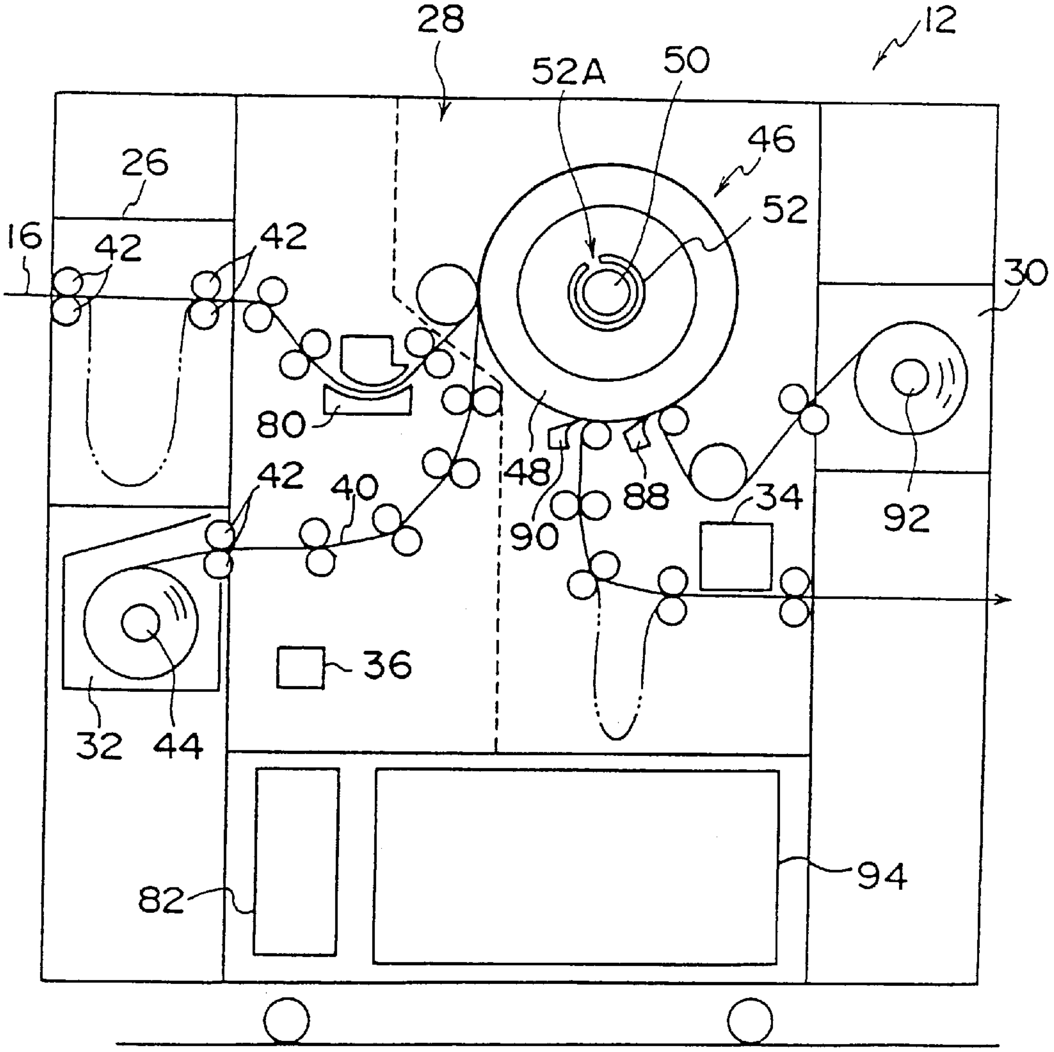
FIG. 1 is a structural view showing a schematic structure of a heat developing apparatus of the present invention.

In FIG. 1, a schematic inner structure of a heat developing apparatus 12, to which the present invention is applied, is illustrated. The heat developing apparatus 12 comprises a face section 26, a heat developing unit 28, a photosensitive material take-up section 30, and an image receiving paper loading section 32. A color measurement sensor 34, a temperature-humidity sensor 36, and the like are also provided as the need arises.

In the heat developing apparatus 12, an image exposure device (not shown) is provided in the vicinity of the side of the face section 26. The image exposure device exposes an image on a photosensitive material 16 used as one of sheet-form materials, and conveys it into the heat developing apparatus 12. The heat developing apparatus 12 may be structured integrally with the image exposure device to form an image forming device.

The photosensitive material 16 can either be an elongated sheet wound up in a roll form, or a sheet cut into a certain length. That is, the photosensitive material 16 can either be a roll or a sheet of photosensitive material as long as it has a sheet form. Below, an explanation will be given that assumes that the roll of elongated photosensitive material is used as the photosensitive material 16.

For example, silver salt sensitive materials sensitive to light in a visible range, PS plates (planograpnic printing plates) sensitive to UV (ultraviolet) light, B (blue) light, and G (green) light, thermosensible materials sensitive to near infrared light, and the like can be used as the photosensitive material 16.

In the image exposure device (not shown), a light beam is used to scan and expose the photosensitive material 16, based on image data. At this time, in the image exposure device, the image data is calibrated based on temperature and humidity within the image processing device 12 detected by the temperature-humidity sensor 36 provided in the heat developing apparatus 12, and on color of the image recorded on the photosensitive material 16, on which heat developing processing has been carried out, detected by the color measurement sensor 34. The photosensitive material 16 is then scanned and exposed based on the corrected image data.

The photosensitive material 16 is fed into the face section 26 of the heat developing apparatus 12. A diverging guide (not shown) which is operated by a solenoid is provided in the face section 26. The diverging guide can be switched between a horizontal state and a vertical state. When the diverging guide is switched to the vertical state, the photosensitive material 16 falls slack and sags between transport rollers 42 as indicated by an imaginary line in FIG. 1. In this way, a difference in speed between the processing rate of the heat developing apparatus 12 and that of the image exposure device may be adjusted. Moreover, the driving of the transport rollers 42 is controlled by a control unit 94 provided in the lower portion of the heat developing apparatus 12.

The image receiving paper loading section 32 is provided below the face section 26. An image receiving paper 40 wound around a paper winding shaft 44 is loaded into the image receiving paper loading section 32 and is conveyed therefrom by the transport rollers 42 in a predetermined direction.

The heat developing unit 28 is provided at the downstream side in the direction the photosensitive material 16 is conveyed. A water application tank 80 filled with water, which is used as an image forming solvent for the photosensitive material 16, is provided in the heat developing unit 28. The water application tank 80 is structured such that water is supplied via a pump (not shown) from a water tank 82 provided in a lower portion of the heat developing apparatus 12. Application of water onto the photosensitive material 16 improves the adhesion between the image receiving paper 40 and the photosensitive material 16 when they are superposed one on top of the other.

Figure 2B:
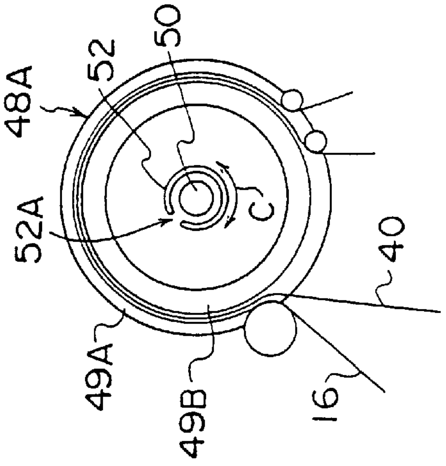
FIG. 2B is a second structural view showing a detailed structure of the heat developing section according to the first embodiment of the present invention, and shows a cross sectional view of FIG. 2A along the line 2B—2B.
Figure 2A:
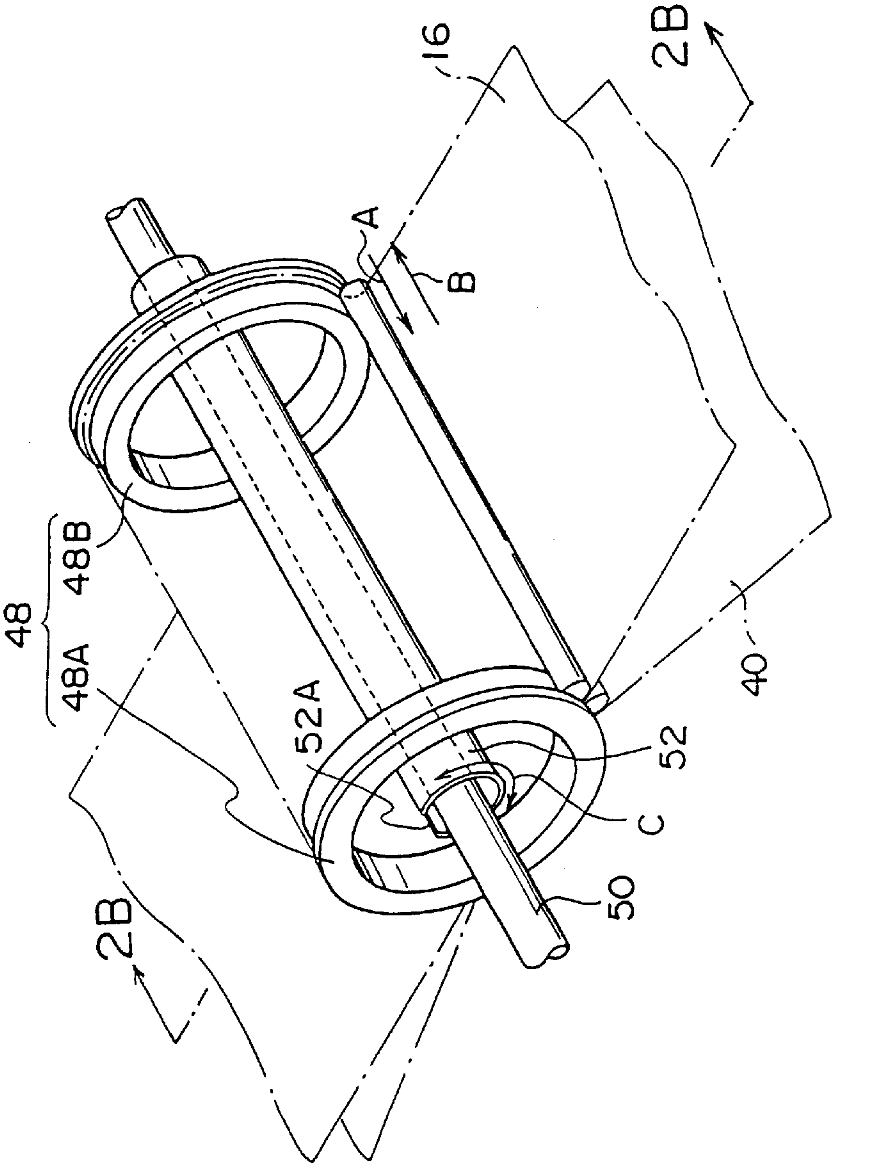
FIG. 2A is a first structural view showing a detailed structure of a heat developing section according to a first embodiment of the present invention, and is a perspective view of the heat developing section in particular.

A heat developing section 46 is provided in the heat developing unit 28 to carry out heat developing processing. The heat developing section 46 comprises a pair of winding rings 48 to wind the photosensitive material 16 and the image receiving paper 40, a heater 50 for heating the photosensitive material 16 and the image receiving paper 40, and a movable shutter 52 to adjust the heating condition of the photosensitive material 16 and the image receiving paper 40, which are heated by heat generated by the heater 50. Referring now to FIGS. 2A and 2B, a detailed structure of the heat developing section 46 will be described.

As shown in FIG. 2A, the winding rings 48 comprise a fixed ring 48A, which is fixed by fixing means (not shown), and a movable ring 48B, which can be slid along the transverse direction of the photosensitive material 16 and the image receiving paper 40 (the direction indicated by arrow A or B in FIG. 2A). That is, the movable ring 48B is to be slid according to the width dimension of the photosensitive material 16 and the image receiving paper 40, which are to be wound around the winding rings 48.

A stopper portion 49A and a winding portion 49B are formed on each of the winding rings 48. An outer diameter of the stopper portion 49A is formed larger than an outer diameter of the winding portion 49B so that both edges of the photosensitive material 16 and the image receiving paper 40 wound around the winding portion 49B of the winding rings 48 are held in position by the stopper portion 49A. In this way, misalignment of the photosensitive material 16 and the image receiving paper 40 in the transverse direction during their conveyance is prevented.

The cylindrical heater 50 is provided at a center position of the winding rings 48. The heater 50 is provided along the transverse direction of the photosensitive material 16 and the image receiving paper 40, and can heat the photosensitive material 16 and the image receiving paper 40 to a proper temperature for the processing during heat developing processing. In the present embodiment, a far infrared radiation heater emitting a far infrared light is used for the heater 50.

The movable shutter 52, in which an opening portion 52A is formed along the transverse direction of the photosensitive material 16 and the image receiving paper 40, is provided in the outer periphery of the heater 50 so as to cover the outer peripheral surface of the heater 50. The movable shutter 52, for example, is formed by rolling up a strip-shaped flat plate made of a heat insulating material into a circular shape so that a gap (referred to as "opening portion 52A" hereafter) of a certain width is formed between one end and the other end of the flat plate. By providing the movable shutter 52 in the outer periphery of the heater 50, the heat (far infrared radiation) generated by the heater 50 is emitted only from the opening portion 52A formed on the movable shutter 52, and directly irradiates and heats the photosensitive material 16 and the image receiving paper 40.

Moreover, the movable shutter 52 is provided so that the shutter 52 can rotate in the directions of arrow C shown in FIGS. 2A and 2B. The heating state of the photosensitive material 16 and the image receiving paper 40 by the heat generated by the heater 50 is adjusted by the width of the opening of the opening portion 52A and by the rotating speed of the movable shutter 52. For example, the heating time of the photosensitive material 16 and the image receiving paper 40 can be adjusted by controlling the rotating speed and the like of the movable shutter 52.

A photosensitive material peeling member 88 which peels apart the photosensitive material 16 and the image receiving paper 40 which were laminated together, and an image receiving paper peeling member 90 which peels the image receiving paper 40 from the winding rings 48 are provided at the downstream side of the heat developing section 46 in the direction the photosensitive material 16 and the image receiving paper 40 are conveyed, as shown in FIG. 1.

The photosensitive material 16 peeled from the image receiving paper 40 by the photosensitive material peeling member 88 is wound around a winding shaft 92, which is provided in the photosensitive material winding section 30, and is then disposed of as waste. Further, the color measurement sensor 34 is provided at the downstream side in the direction to which the image receiving paper 40, which has been peeled from the winding rings 48 by the image receiving paper peeling member 90 and on which an image has been formed, is conveyed. The color measurement sensor 34 measures the color of the image which has been formed on the image receiving paper 40, then outputs to an image exposure device (not shown) the correction data having been provided from a correction data forming device (not shown)

to which the measured data is input. The image receiving paper 40, which has been subjected to color detection by the color measurement sensor 34, is then discharged from the heat developing apparatus 12 to the outside of the apparatus 12.

Operation of the first embodiment of the present invention will be described hereinafter.

The image exposure device (not shown) scans and exposes the photosensitive material 16 with the light beam, on the basis of the image data. The photosensitive material 16 already scanned and exposed is then conveyed to the heat developing apparatus 12. The photosensitive material 16 is fed from the face section 26 into the heat developing apparatus 12 and soaked in water in the water application tank 80 provided in the heat developing unit 28 for water application. Subsequently, in the heat developing apparatus 12, the photosensitive material 16 is conveyed to the heat developing section 46.

In the heat developing apparatus 12, synchronizing with the conveyance of the photosensitive material 16, the image receiving paper 40 is drawn out from the image receiving paper loading section 32 and conveyed to the heat developing section 46 in the heat developing unit 28. In this way, the photosensitive material 16 and the image receiving paper 40 are superposed one on top of the other, and heat developing processing is carried out in the heat developing section 46.

The winding rings 48 comprising the fixed ring 48A and the movable ring 48B are provided in the heat developing section 46, and the two transverse direction ends of the photosensitive material 16 and the image receiving paper 40 are wound around the fixed ring 48A and the movable ring 48B, respectively. Moreover, when it is sensed that the photosensitive material 16 and the image receiving paper 40 have touched the winding rings 48, for example, the control unit 94 instructs the motion of the movable ring 48B, and the movable ring 48B is moved by moving means (not shown) in correspondence with the width dimension of the photosensitive material 16 and the image receiving paper 40. In this way, the photosensitive material 16 and the image receiving paper 40 wound around the winding rings 48 are prevented from being misaligned in the transverse direction when they are conveyed.

Further, only the two transverse direction ends of the photosensitive material 16 and the image receiving paper 40 are wound around the winding rings 48. Heat developing processing is carried out on the photosensitive material 16 and the image receiving paper 40 by the heater 50 in a state in which the photosensitive material 16 and the image receiving paper 40 are wound around the winding rings 48. While heat developing processing is carried out, the heating time for the photosensitive material 16 and the image receiving paper 40 is adjusted by rotating the movable shutter 52 provided near the outer periphery of the heater 50 at a predetermined speed. Moreover, since heat developing processing is carried out on the photosensitive material 16 and the image receiving paper 40 in such a manner that only the two transverse direction ends thereof are wound around the winding rings 48, the photosensitive material 16 and the image receiving paper 40 can be heated directly by the heat generated by the heater 50 via the opening portion 52A formed in the movable shutter 52.

In this way, the photosensitive material 16 and the image receiving paper 40 are heated to form an image on the image receiving paper 40. The photosensitive material 16, on which heat developing processing has been carried out, is wound around the photosensitive material take-up section 30, and is then disposed of as waste. On the other hand, the image receiving paper 40 on which an image has been formed is discharged from the heat developing apparatus 12 and conveyed to devices of subsequent processes such as a printing processing device.

Since heat developing processing is carried out in such a manner that only the two transverse direction ends of the photosensitive material 16 and the image receiving paper 40 are wound around the winding rings 48, the photosensitive material 16 and the image receiving paper 40 can be heated directly by the heat generated by the heater 50 in the heat developing section 46. Accordingly, since there is no need for a large-capacity heater, manufacturing costs of the heat developing apparatus can be reduced, and heat developing processing can be carried out by effectively utilizing the heat generated by the heater 50. Moreover, since heat developing processing is carried out in such a manner that only the two transverse direction ends of the photosensitive material 16 and the image receiving paper 40 are wound around the winding rings 48, there is no need for a mechanism for causing the photosensitive material and the image receiving paper to contact with, or to be attached by pressure to a heating drum and a heating plate, so that the structure of the heat developing apparatus can be simplified. Further, since there is no need for a heating drum or a heating plate, the temperature can easily be adjusted to a value suitable for heat developing processing, and a stable heat developing processing can be realized without causing an uneven developing and the like.

Although the present embodiment describes a case in which the opening portion 52A is formed along the transverse direction of the photosensitive material 16 and the image receiving paper 40 in the movable shutter 52 provided near the outer periphery of the heater 50, the form of the opening portion 52A is not limited to the same. For example, in a case in which the state of heat distribution is not uniform, a movable shutter can be provided, wherein the movable shutter is capable of adjusting the heat generated by the heater such that the state of heat distribution becomes uniform by forming the opening portion into a shape corresponding with the state of heat distribution, or by providing a shielding plate.

Figure 3A:
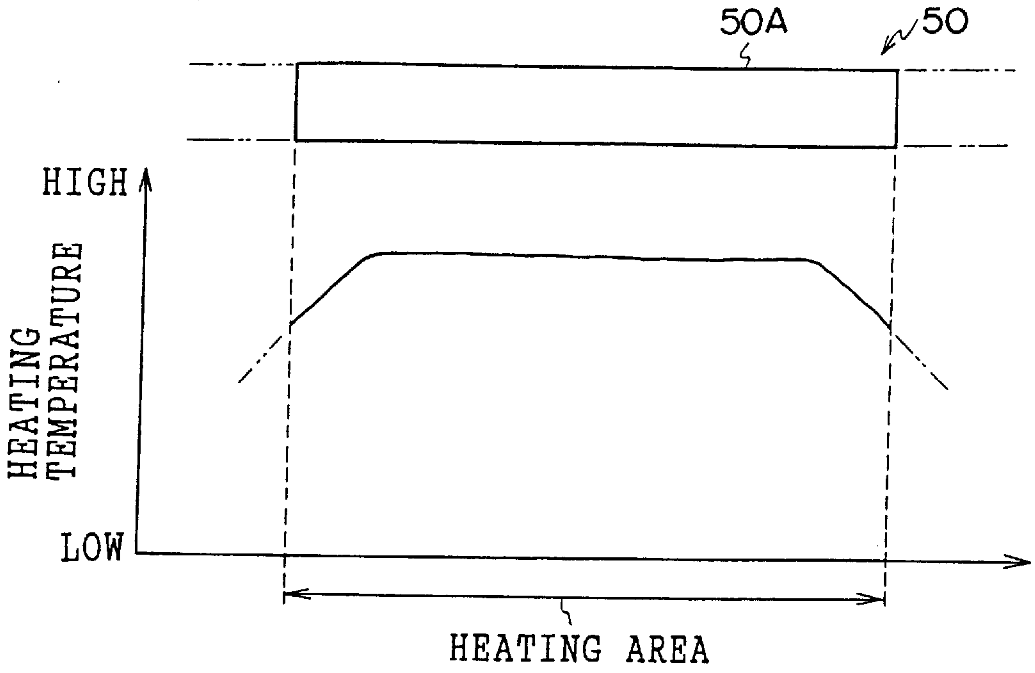
FIG. 3A is a diagram showing a heating portion of a heater and a schema of the heating temperature dependent on the heating portion of the heater.

That is, a heating portion 50A of the cylindrical heater 50 emits substantially uniform heat in the center portion along the longitudinal direction, while the heating value lowers at the two longitudinal direction end portions. Therefore, as shown in FIG. 3A, when the length of the heating portion 50A coincides with the heating area, the heating temperature lowers at the two ends of the heating area which face the two transverse direction end portions of the heating portion 50A. Accordingly, when the longitudinal direction of the heating portion 50A of the heater 50 is disposed along the transverse direction of the photosensitive material 16 and the image receiving paper 40, and the heater 50 heats the photosensitive material 16 and the image receiving paper 40, the heating temperature at the two transverse direction ends of the photosensitive material 16 and the image receiving paper 40 is lower than that of the central portion thereof.

In order to prevent the heating temperature from lowering in the areas facing the two end portions of the heating portion 50A of the heater 50 of the above description, the heater 50 which has the heating portion 50A longer than the width dimension of the photosensitive material 16 and the image receiving paper 40 must be used, and the photosensitive material 16 and the image receiving paper 40 must be heated in an area where the heating value is uniform. Accordingly, the apparatus becomes larger, and the thermal efficiency lowers.

Figure 3B:
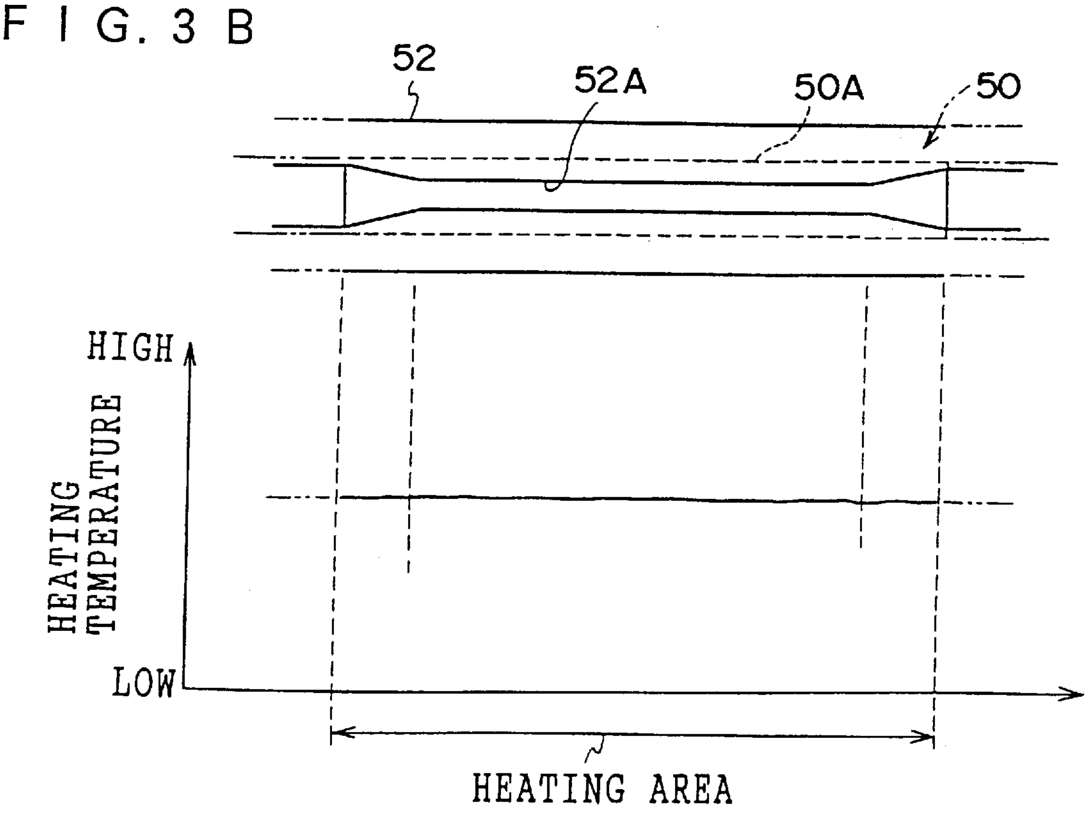
FIG. 3B is a diagram showing a movable shutter forming an opening corresponding with the heating temperature of the heater and a schema of the heating temperature dependent on the heater accommodated in the movable shutter.

In contrast, as shown in FIG. 3B, the opening portion 52A of the movable shutter 52 is modified in accordance with the quantity of heat emitted from the heater 50. That is, the width of the opening at the two end portions of the heating portion 50A, where the quantity of heat is low, is made wider than that in the middle portion along the longitudinal direction in accordance with the heating temperature change.

In this way, the heating temperature by the middle portion of the heating portion 50A and by the two end portions thereof can be made substantially the same, and the heating temperature of the photosensitive material 16 and the image receiving paper 40 can be made substantially uniform even if the length of the heating portion 50A of the heater 50 is substantially the same with the transverse length of the photosensitive material 16 and the image receiving paper 40. Therefore, the uniform heating of the photosensitive material 16 and the image receiving paper 40 along the transverse direction can securely prevent uneven developing from being caused, and form a finished image of high quality on the image receiving paper 40.

Although the present embodiment describes a case in which a far infrared radiation heater is used as the heater, the present invention is not limited to the same, and any heater which is capable of heating the photosensitive material and the image receiving paper can be used. However, when silver salt photosensitive materials sensitive to light in a visible range, PS plates sensitive to UV (ultraviolet) light, B (blue) light, and G (green) light, photo-thermosensitive materials sensitive to a near infrared light, and the like are used as the photosensitive material, it is preferable that a far infrared radiation heater is used.

Figure 4B:
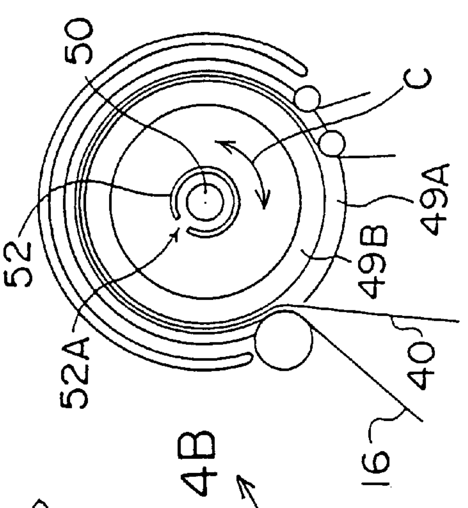
FIG. 4B is a second structural view showing a detailed structure of the heat developing section according the other embodiment of the present invention, and shows a cross-sectional view of FIG. 4A along the line 4B—4B.
Figure 4A:
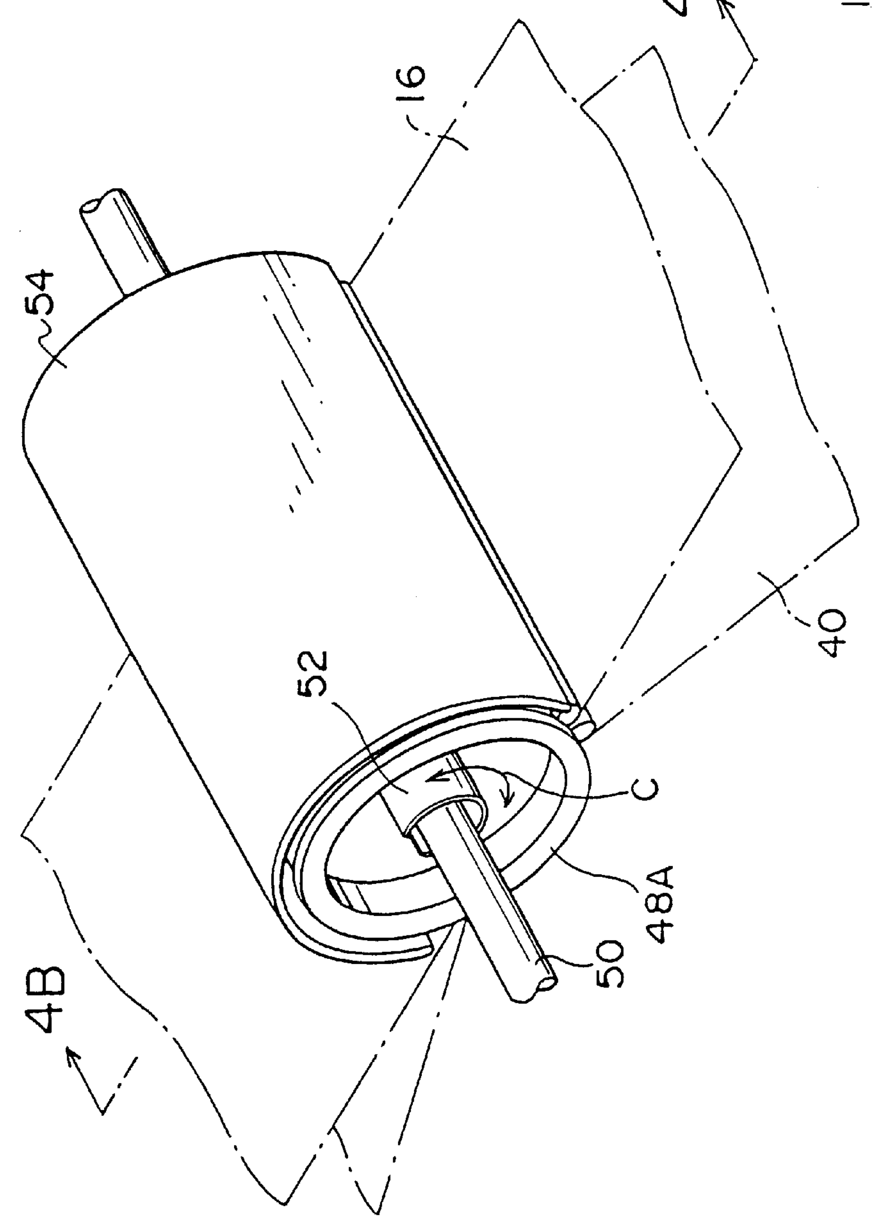
FIG. 4A is a first structural view showing a detailed structure of a heat developing section according to another embodiment of the present invention, and is a perspective view of main portions of the heat developing section.

Moreover, as shown in FIGS. 4A and 4B, a circular arc-shaped reflector 54 can be provided along the outer peripheral surface of the photosensitive material 16 and the image receiving paper 40 wound around the winding rings 48. In this way, the heat, which has been emitted from the heater 50 via the opening portion 52A of the movable shutter 52 and has transmitted thorugh the photosensitive material 16 and the image receiving paper 40, is reflected by the reflector 54 to be reused for heat developing processing. Accordingly, heat developing processing on the photosensitive material 16 and the image receiving paper 40 can be carried out while effectively utilizing the heat generated by the heater 50.

Figure 5:
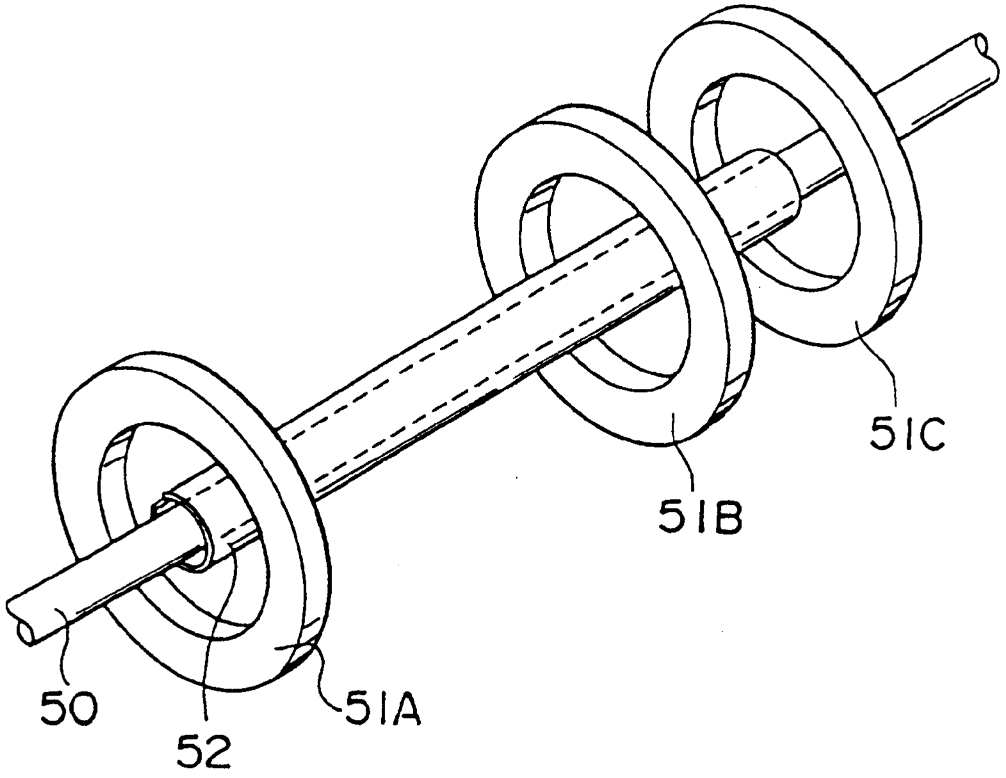
FIG. 5 is a schematic structural view showing a schematic structure of a heat developing section according to still another embodiment of the present invention.

Further, although the winding rings 48 according to the present embodiment comprises the fixed ring 48A and the movable ring 48B, and can be adjusted such that the space therebetween corresponds with the width dimension of the photosensitive material 16 and the image receiving paper 40 by moving the movable ring 48B, the present invention is not limited to the same. For example, as shown in FIG. 5, a winding ring 51A, which is used commonly by all photosensitive materials and image receiving papers with plural and different width dimensions, can be disposed in a position which corresponds with one transverse direction end of the photosensitive material and the image receiving paper, and winding rings 51B and 51C can be provided respectively in a position which corresponds with each of the other transverse direction ends of the photosensitive material and the image receiving paper with different width dimensions.

That is, it can be structured such that the winding rings corresponding with the width dimension of the photosensitive material 16 and the image receiving paper 40 are selected, and the photosensitive material 16 and the image receiving paper 40 are wound around the appropriate winding rings. In this case, it is preferable that each of the winding rings 51A, 51B, 51C is formed as a winding ring with a uniform outer diameter unlike the winding ring 48 according to the present embodiment, which has the winding portion 49A and the stopper portion 49B being formed thereon. It is also preferable that the winding rings 51A, 51B, 51C are formed with a material such as heat-resisting glass which transmits far infrared radiation emitted from the heater 50.

Second Embodiment

A second embodiment of the present invention will be described hereinafter. Since the basic structure of the second embodiment is the same as that of the above-described first embodiment, the same reference numerals are used to designate elements which are the same as those of the first embodiment and detailed description thereof will be omitted.

Figure 6B:
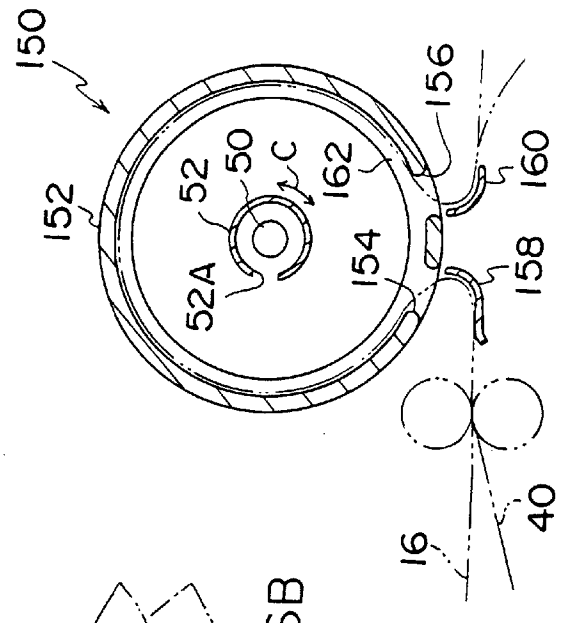
FIG. 6B is a second structural view showing a detailed structure of the heat developing section according to the second embodiment of the present invention, and shows a cross-sectional view of FIG. 6A along the line 6B—6B.
Figure 6A:
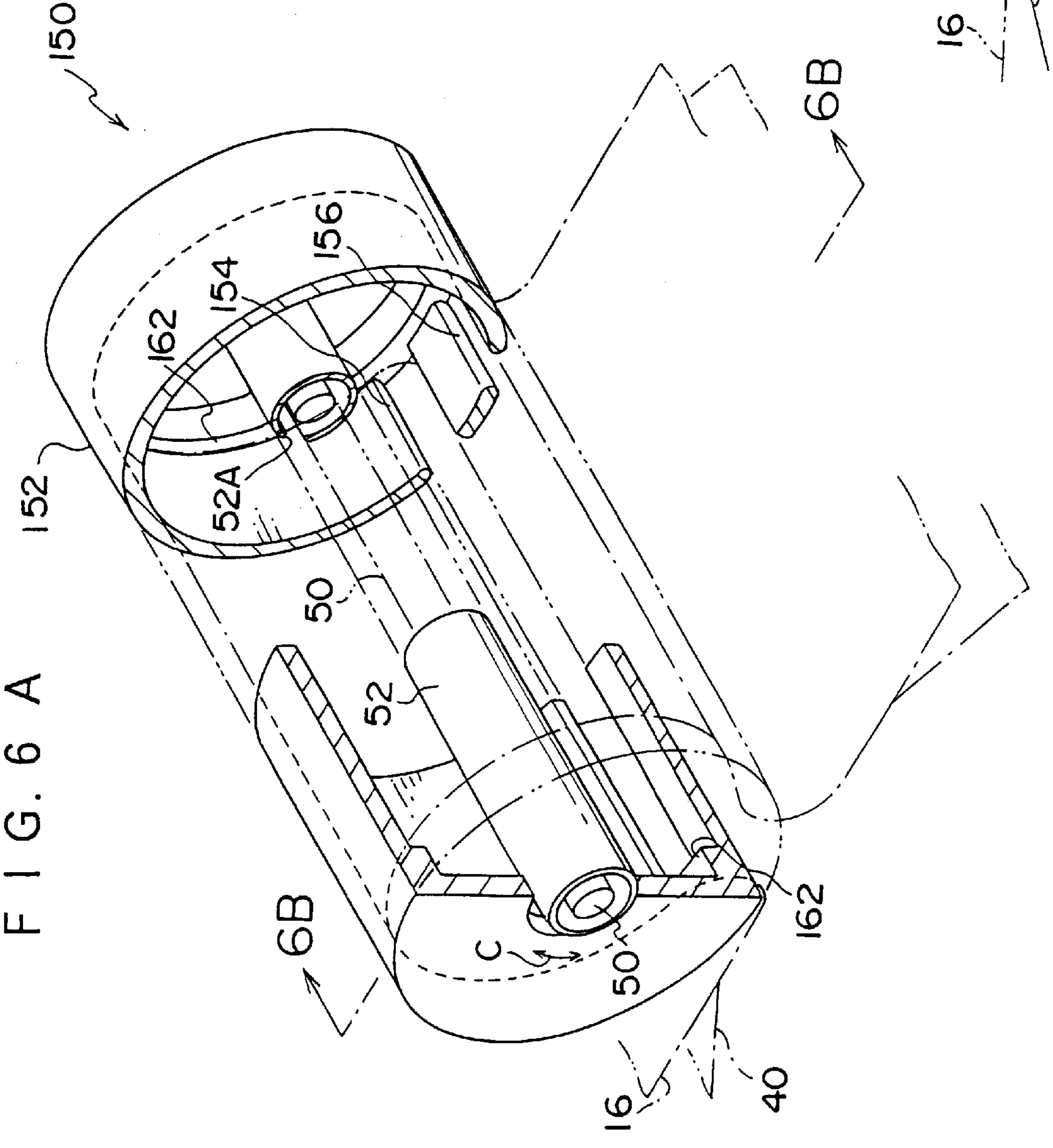
FIG. 6A is a first structural view showing a detailed structure of a heat developing section according to a second embodiment of the present invention, and is a perspective view of the heat developing section.

FIGS. 6A and 6B illustrate a schematic structure of a heat developing section 150 according to the second embodiment. The heat developing section 150 may be used, for example, in place of the heat developing section 46 of the above-described first embodiment.

The heat developing section 150 comprises a cylindrical winding member 152. The inside of the winding member 152 is hollow.

The heater 50 is provided at an axial portion of the winding member 152 such that the axial direction thereof is parallel to the longitudinal direction of the winding member 152. Moreover, the periphery of the heater 50 is surrounded by the movable shutter 52, and the heat generated by the heater 50 is radiated from the opening portion 52A of the movable shutter 52.

A slit-shaped insertion opening 154 and a slit-shaped outlet opening 156 are formed adjacent to each other along the axial direction of the winding member 152 at an outer peripheral portion thereof such that the respective longitudinal directions are parallel to each other. The length of the insertion opening 154 and the outlet opening 156 corresponds with the width dimension of the photosensitive material 16 and the image receiving paper 40 which are to be processed in the heat developing section 150, so that the photosensitive material 16 and the image receiving paper 40 can be inserted from the insertion opening 154 in a state in which they are superposed one on top of the other, and the photosensitive material 16 and the image receiving paper 40 inserted in the winding member 152 can be drawn out from the outlet opening 156.

In the heat developing section 150, an insertion guide 158 is provided so as to face the insertion opening 154 of the winding member 152, and an outlet guide 160 is provided so as to face the outlet opening 156 as shown in FIG. 6B. The insertion guide 158 and the outlet guide 160 are formed such that the sectional form along the direction the photosensitive material 16 is conveyed is a substantially circular arc, and the tip portions thereof respectively face the insertion opening 154 and the outlet opening 156.

Moreover, as shown in FIG. 6A and FIG. 6B, stopper portions 162 are formed at the two axial direction ends of the winding member 152, and the stopper portions 162 prevent the photosensitive material 16 and the image receiving paper 40 from being misaligned in the transverse direction.

Leading edges of the photosensitive material 16 and the image receiving paper 40 conveyed to the heat developing section 150 are guided to the insertion opening 154 of the winding member 152 by the insertion guide 158 in a state in which the photosensitive material 16 and the image receiving paper 40 are superposed one on top of the other, and are inserted from the insertion opening 154 into the winding member 152. Being further conveyed into the winding member 152, the photosensitive material 16 and the image receiving paper 40, whose leading edges have been inserted into the insertion opening 154, are moved along the curved inner circumferential surface of the winding member 152 toward the outlet opening 156 in a state in which the photosensitive material 16 and the image receiving paper 40 are superposed one on top of the other.

In this way, the photosensitive material 16 and the image receiving paper 40 are wound around along the inner circumferential surface of the winding member 152 in a state in which they are curved in a circular arc shape. At this time, due to tenacity/toughness of the photosensitive material 16 and the image receiving paper 40, the photosensitive material 16 and the image receiving paper 40 closely contact each other and also with the inner circumferential surface of the winding member 152.

Moreover, in the heat developing section 150, when heat developing processing is completed in the winding member 152, the photosensitive material 16 and the image receiving paper 40 are drawn out from the winding member 152. At this time, the photosensitive material 16 and the image receiving paper 40 are further conveyed, for example, from the insertion opening 154 side into the winding member 152. Accordingly, the leading edges of the photosensitive material 16 and the image receiving paper 40 in the winding member 152 protrude from the outlet opening 156, and are guided toward the discharging direction by the outlet guide 160. Subsequently, the photosensitive material 16 and the image receiving paper 40 in the winding member 152 are conveyed through the outlet opening 156, and the image receiving paper 40 is peeled from the photosensitive material 16 by peeling means (not shown) and discharged.

In the heat developing section 150 structured in this way, heat developing processing is carried out by heating the photosensitive material 16 and the image receiving paper 40 by the heater 50 in a state in which the photosensitive material 16 and the image receiving paper 40 are wound around along the inner circumferential surface of the winding member 152.

At this time, since the heater 50 is contained inside the cylindrically formed winding member 152, this structure can prevent the temperature from being changed under the influence of outside air, and can heat each of the photosensitive material 16 and the image receiving paper 40 uniformly. Moreover, since the winding member 152 also works as a reflector due to being formed cylindrically, the thermal efficiency of the heater 50 while heating the photosensitive material 16 and the image receiving paper 40 can be improved. When the air inside the winding section 152 must be discharged or ventilation inside the winding section 152 is necessary, ventilating holes may be provided at the two axial direction ends, or ventilating means may be provided.

In this way, in the heat developing section 150, a simple structure utilizing the winding member 152 of a substantially cylindrical form as winding means can heat the photosensitive material 16 and the image receiving paper 40 efficiently to carry out developing processing.

Although the second embodiment of the present invention describes a case in which the winding member 152 of a substantially cylindrical form is used as the winding means, and the photosensitive material 16 and the image receiving paper 40 are curved in a circular arc shape by being positioned along the inner circumferential surface of the winding member 152, any mechanism which causes the photosensitive material 16 and the image receiving paper 40 to be curved in a circular arc shape by contacting at least the two transverse direction ends of the photosensitive material 16 and the image receiving paper 40 can be used as the winding means.

Figure 7:
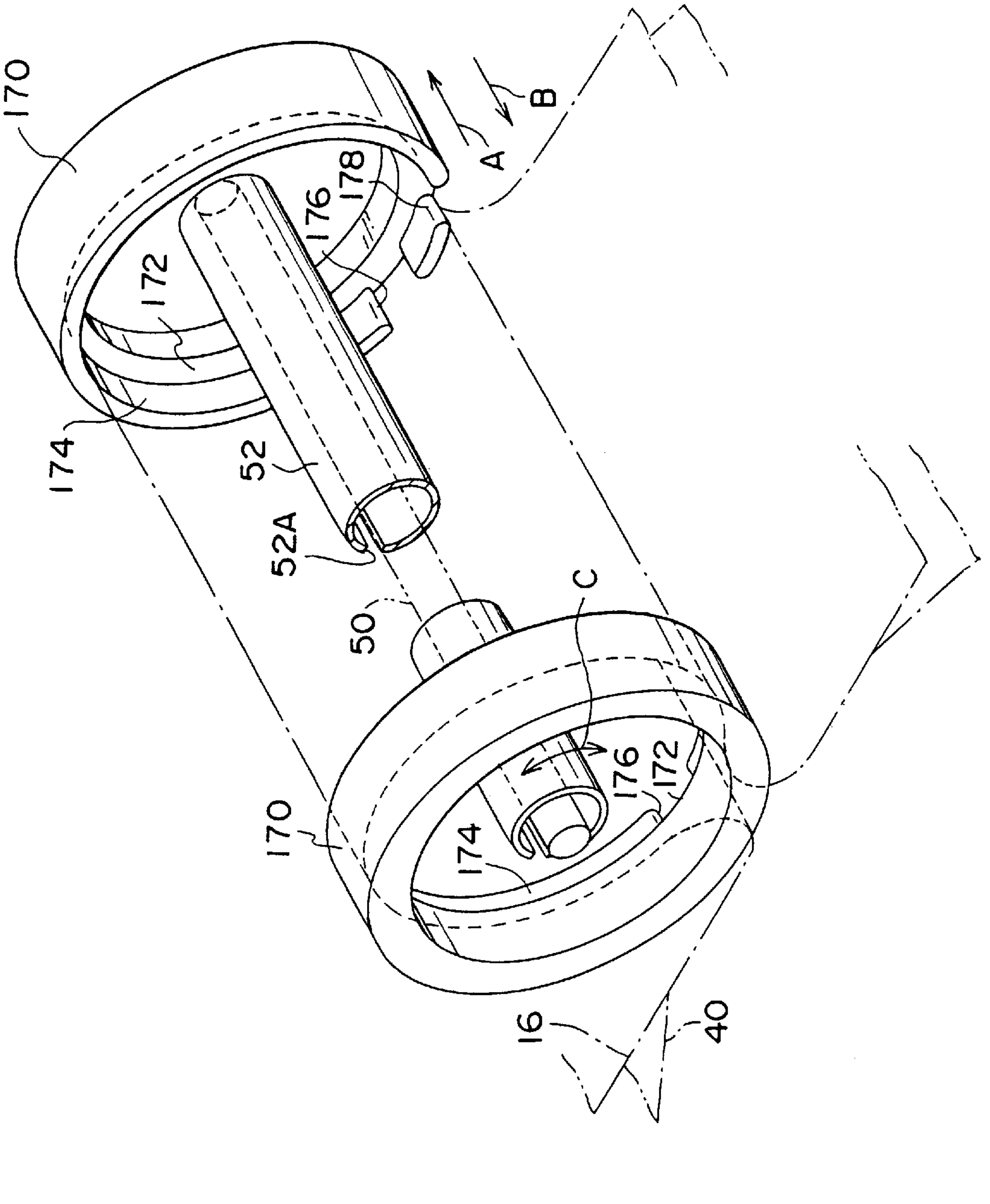
FIG. 7 is a perspective view of main portions, showing another example of the heat developing section according to the second embodiment of the present invention.
Figure 8:
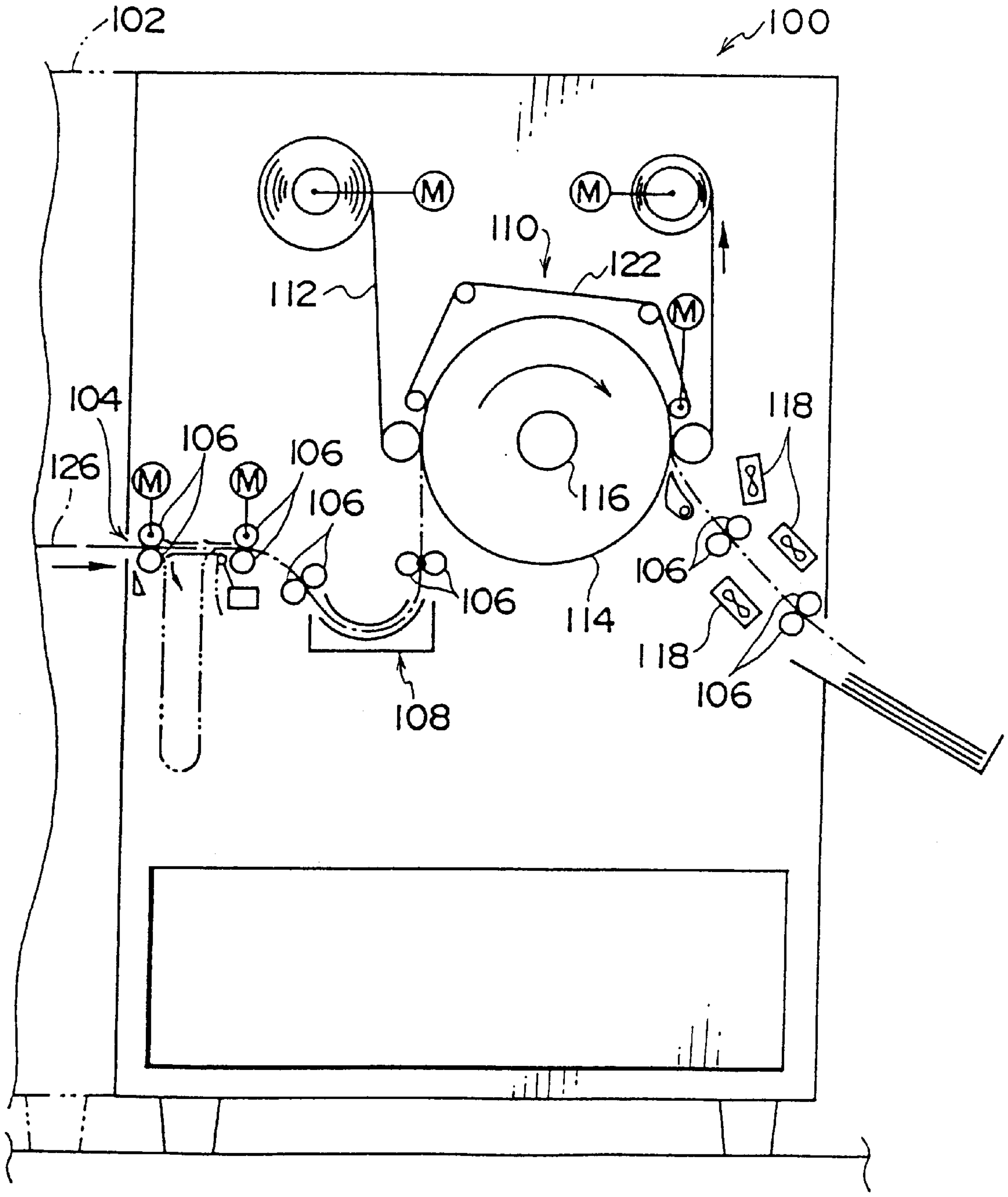
FIG. 8 PRIOR ART
FIG. 8 is an inner structural view showing a heat developing apparatus of the prior art in which a heating drum is provided.
Figure 9:
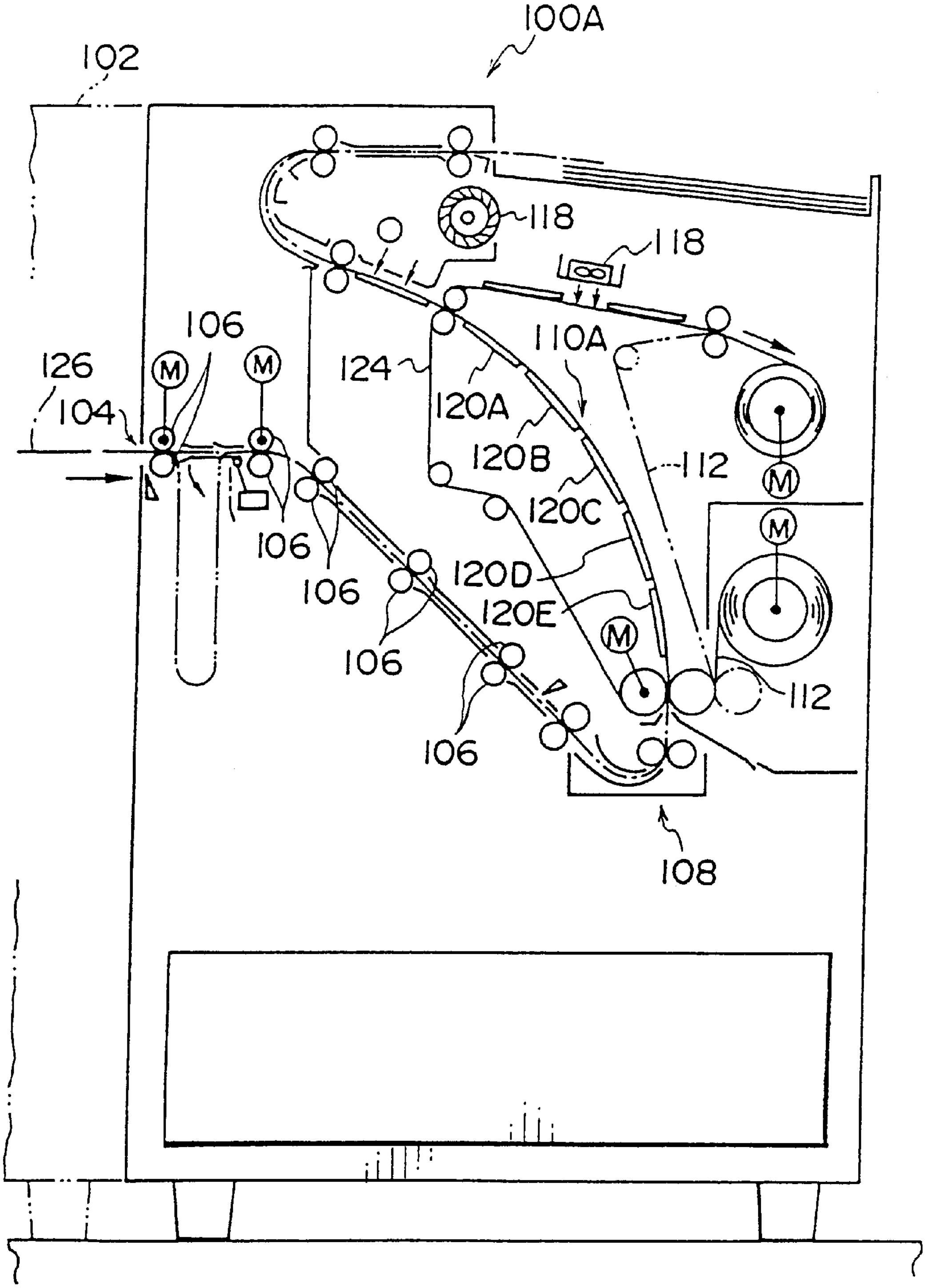
FIG. 9 PRIOR ART
FIG. 9 is an inner block diagram showing a heat developing apparatus of the prior art in which a plurality of heating plates are provided.

Winding rings 170 shown in FIG. 7, for example, can be used as such winding means. The winding ring 170 comprises a stopper portion 172 and a winding portion 174, and the winding rings 170 are provided at the two transverse direction ends of the photosensitive material 16 and the image receiving paper 40 so as to oppose each other.

In the winding ring 170, a slit 176 used for inserting the photosensitive material 16 and the image receiving paper 40 into the winding portion 174, and a slit 178 used for discharging the same from the winding portion 174 are formed. Moreover, an inner diameter of the stopper portion 172 is formed smaller than an inner diameter of the winding portion 174, so that when the photosensitive material 16 and the image receiving paper 40 are set inside the winding portions 174, movement in the transverse direction is restrained.

When the leading edges of the photosensitive material 16 and the image receiving paper 40 are inserted from the slits 176, the winding rings 170 guide the photosensitive material 16 and the image receiving paper 40 along the inner circumferential surface of the winding portions 174. In this way, the photosensitive material 16 and the image receiving paper 40 are curved in a circular arc shape while the two transverse direction ends thereof are within the winding portions 174.

When the two transverse direction ends of the photosensitive material 16 and the image receiving paper 40 are curved, the center portion thereof is curved accordingly, so that the portion of the photosensitive material 16 and the image receiving paper 40 between the two winding rings 170 becomes substantially cylindrical. In this way, the photosensitive material 16 and the image receiving paper 40 can be heated uniformly by the heater 50 disposed at an axial portion of the winding rings 170.

Even in a case in which the winding rings 170 described above are used, heat developing processing of the photosensitive material 16 and the image receiving paper 40 of various sizes becomes possible by fixing one of the winding rings 170 and by moving the other movable winding ring 170 along the axial direction (the direction indicated by arrow A and arrow B) in accordance with the width dimension of the photosensitive material 16 and the image receiving paper 40.

Moreover, processing of the photosensitive material 16 and the image receiving paper 40 of various types with different width dimensions becomes possible by disposing a plurality of winding rings (not shown), which are each structured only with the winding portion 174, without the stopper portion 172, and by moving the winding rings. Furthermore, the reflector 54 may be disposed so as to cover the photosensitive material 16 and the image receiving paper 40, which have been curved in a substantially circular arc shape between the winding rings 170.

Although in the above-described first and second embodiments of the present invention, the photosensitive material 16 and the image receiving paper 40 of the elongated type are used as sheet-form materials, the present invention is not limited to the same, and the photosensitive material 16 and the image receiving paper 40 may be a cut sheet which has been cut into a certain length. Moreover, the heating apparatus of the present invention is not limited to use for heating the photosensitive material 16 and the image receiving paper 40, and can be applied to heating apparatuses which heat other photosensitive materials. Furthermore, the present invention can be used in heating apparatuses which heat various sheet-form materials not limited to photosensitive materials.

In accordance with the present invention described above, since heat developing processing is carried out by heating means by directly heating a sheet-form material wound around along winding means, which is provided at positions corresponding with the two transverse direction ends of a sheet-form material, it has an advantage such that heat developing processing can be carried out on the sheet-form material by effectively utilizing the heat generated by the heating means.

What is claimed is:

1. A heating apparatus which forms an image by heating a sheet-form material, the sheet-form material carrying image data thereon, said heating apparatus comprising:

- a heater, disposed at an axial center portion of the sheet-form material, for directly heating the sheet-form material to a temperature at which heat developing processing occurs; and
- a plurality of winding rings disposed at positions corresponding to both transverse direction ends of the sheet-form material, the winding rings contacting the sheet-form material such that the sheet-form material is wound around along the winding rings, thereby curving the sheet-form material in a circular arc shape in a state in which an entire inner circumferential surface of the sheet-form material, in which the image data is carried thereon, is directly exposed to the heater.

2. A heating apparatus according to claim 1, wherein said sheet-form material is curved in a circular arc shape around an internal surface of the winding rings.

3. A heating apparatus according to claim 2, wherein at least one of said winding rings is movable along the transverse direction of the sheet-form material.

4. A heating apparatus according to claim 3, further comprising a heat adjuster for adjusting a heating state of the sheet-form material by said heater, wherein said heat adjuster is disposed so as to cover an outer peripheral surface of said heater.

5. A heating apparatus according to claim 2, further comprising a reflector for reflecting heat emitted by said heater towards the sheet-form material, said reflector covering the sheet-form material.

6. A heating apparatus according to claim 2, further comprising a heat adjuster for adjusting a heating state of the sheet-form material by said heater, wherein said heat adjuster is disposed so as to cover an outer peripheral surface of said heater.

7. A heating apparatus according to claim 1, wherein said sheet-form material is curved in a circular arc shape around an outer surface of the winding rings.

8. A heating apparatus according to claim 7, wherein at least one of said winding rings is movable along the transverse direction of the sheet-form material.

9. A heating apparatus according to claim 8, further comprising a heat adjuster for adjusting a heating state of the sheet-form material by said heater, wherein said heat adjuster is disposed so as to cover an outer peripheral surface of said heater.

10. A heating apparatus according to claim 7, further comprising a reflector for reflecting heat emitted by said heater towards the sheet-form material, said reflector covering the sheet-form material.

11. A heating apparatus according to claim 7, further comprising a heat adjuster for adjusting a heating state of the sheet-form material by said heater, wherein said heat adjuster is disposed so as to cover an outer peripheral surface of said heater.

12. A heating apparatus according to claim 1, wherein at least one of said winding rings is movable along the transverse direction of the sheet-form material.

13. A heating apparatus according to claim 12, further comprising a reflector for reflecting heat emitted by said heater towards the sheet-form material, said reflector covering the sheet-form material.

14. A heating apparatus according to claim 12, further comprising a heat adjuster for adjusting a heating state of the sheet-form material by said heater, wherein said heat adjuster is disposed so as to cover an outer peripheral surface of said heater.

15. A heating apparatus according to claim 1, further comprising a reflector for reflecting heat emitted by said heater towards the sheet-form material, said reflector covering the sheet-form material.

16. A heating apparatus according to claim 1, further comprising a heat adjuster for adjusting a heating state of the sheet-form material by said heater, wherein said heat adjuster is disposed so as to cover an outer peripheral surface of said heater.

17. A heating apparatus according to claim 16, wherein said heat adjuster comprises a heat insulating member in which a slit-form opening portion with a predetermined width is formed along the transverse direction of the sheet-form material.

18. A heating apparatus according to claim 17, wherein said opening portion, which faces said heater, of said heat adjuster is formed with a shape corresponding with a state of heat distribution.

19. A heating apparatus according to claim 16, wherein said heat adjuster comprises a movable shutter having an opening portion along the axial direction of said heater.

20. A heating apparatus according to claim 1, wherein the winding rings comprise a stopper portion and a winding portion for aligning the sheet-form material, and wherein an outer diameter of the stopper portion is larger than an outer diameter of the winding portion.

21. A heating apparatus which forms an image by heating a sheet-form material, the sheet-form material carrying image data thereon, said heating apparatus comprising:

- a heater, disposed at an axial center portion of the sheet-form material, for directly heating the sheet-form material to a temperature at which heat developing processing occurs; and
- a cylindrical member, contacting the sheet-form material such that the sheet-form material is curved along an inner circumferential surface of said cylindrical member, thereby curving the sheet-form material in a circular arc shape in a state in which an entire inner circumferential surface of the sheet-form material, in which the image data is carried thereon, is directly exposed to the heater.

22. A heating apparatus according to claim 21, further comprising a heat adjuster for adjusting a heating state of the sheet-form material by said heater, wherein said heat adjuster is disposed so as to cover an outer peripheral surface of said heater.

23. A heating apparatus according to claim 22, wherein said heat adjuster comprises a heat insulating member in which a slit-form opening portion with a predetermined width is formed along the transverse direction of the sheet-form material.

24. A heating apparatus which forms an image by heating a sheet-form material, the sheet-form material carrying image data thereon, said heating apparatus comprising:

- a heater, disposed at an axial center portion of the sheet-form material, for directly heating the sheet-form material to a temperature at which heat developing processing occurs; and a plurality of winding rings, wherein at least one of said winding rings is positioned at a first transverse direction end of the sheet-form material, and wherein each remaining winding ring of said winding rings is movable to be positioned to correspond to a predetermined spaced widths according to predetermined width dimensions of a plurality of sheet-form material, wherein the winding rings contact the sheet-form material, thereby curving the sheet-form material in a circular arc shape in a state in which image data carried thereon is exposed to the heater.

25. A heating apparatus according to claim 24, further comprising a reflector for reflecting heat emitted by said heater towards the sheet-form material, said reflector covering the sheet-form material.

26. A heating apparatus according to claim 24, further comprising a heat adjuster for adjusting a heating state of the sheet-form material by said heater, wherein said heat adjuster is disposed so as to cover an outer peripheral surface of said heater.

27. A heating apparatus according to claim 26, wherein said heat adjuster comprises a heat insulating member in which a slit-form opening portion is formed along the transverse direction of the sheet-form material.

* * * * *